United States Patent [19]

Sitnam

[11] 4,286,580
[45] Sep. 1, 1981

[54] SOLAR COLLECTOR

[76] Inventor: Elmo Sitnam, 2780 Mt. Seymour Pkwy., North Vancouver, British Columbia, Canada, V7H 1E9

[21] Appl. No.: 47,064

[22] Filed: Jun. 11, 1979

[51] Int. Cl.³ .............................................. I24J 3/02
[52] U.S. Cl. .................................. 126/438; 126/439; 126/448
[58] Field of Search .............. 126/438, 439, 440, 451, 126/446, 448

[56] References Cited

U.S. PATENT DOCUMENTS

| 1,989,999 | 2/1935 | Niederle | 126/438 |
| 3,974,824 | 8/1976 | Smith | 126/438 |
| 4,007,729 | 2/1977 | Chao et al. | 126/446 |
| 4,011,855 | 3/1977 | Eshelman | 126/438 |
| 4,026,273 | 5/1977 | Parker | 126/438 |
| 4,211,211 | 7/1980 | Toomey et al. | 126/439 |

FOREIGN PATENT DOCUMENTS

| 246973 | 7/1975 | Fed. Rep. of Germany | 126/443 |
| 2355253 | 1/1978 | France | 126/448 |

Primary Examiner—James C. Yeung
Attorney, Agent, or Firm—Fulwider, Patton, Rieber, Lee & Utecht

[57] ABSTRACT

A solar collector comprises an elongate, central conduit for fluid and a laterally concave reflective surface facing the central conduit. The central conduit extends centrally along the laterally concave surface. The surface has a shape to reflect solar radiation onto the conduit. A reflective fin is connected to the conduit and extends away from the reflective surface. The fin has a concave shape to reflect solar radiation striking the fin onto the conduit.

16 Claims, 8 Drawing Figures

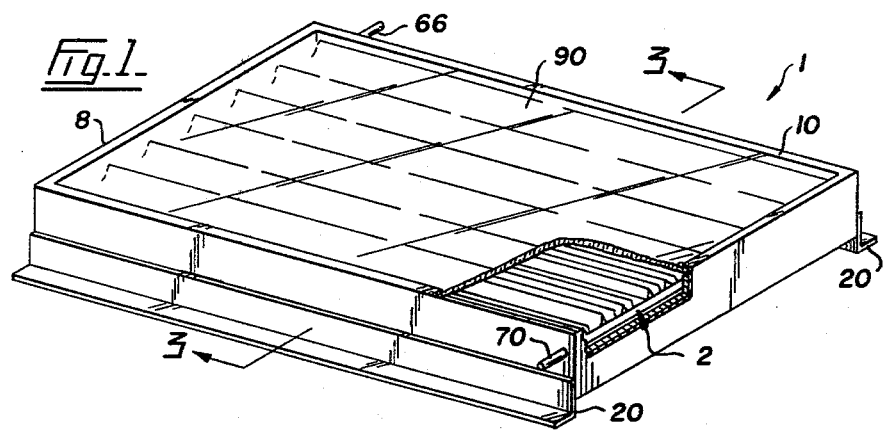
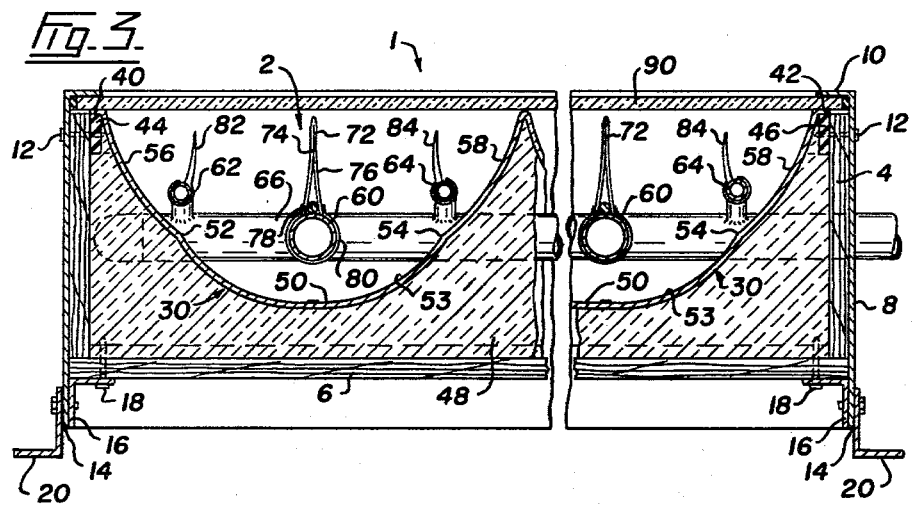
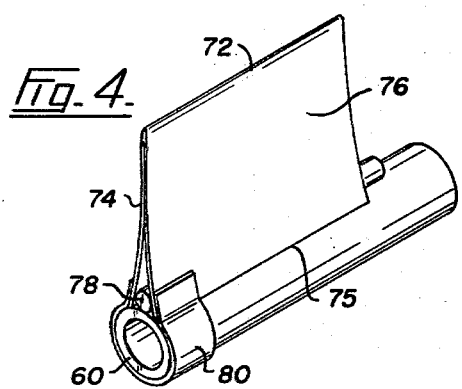
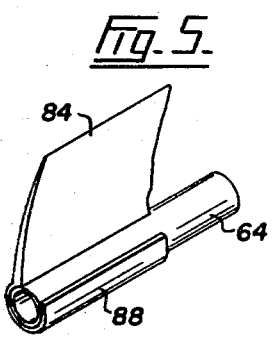

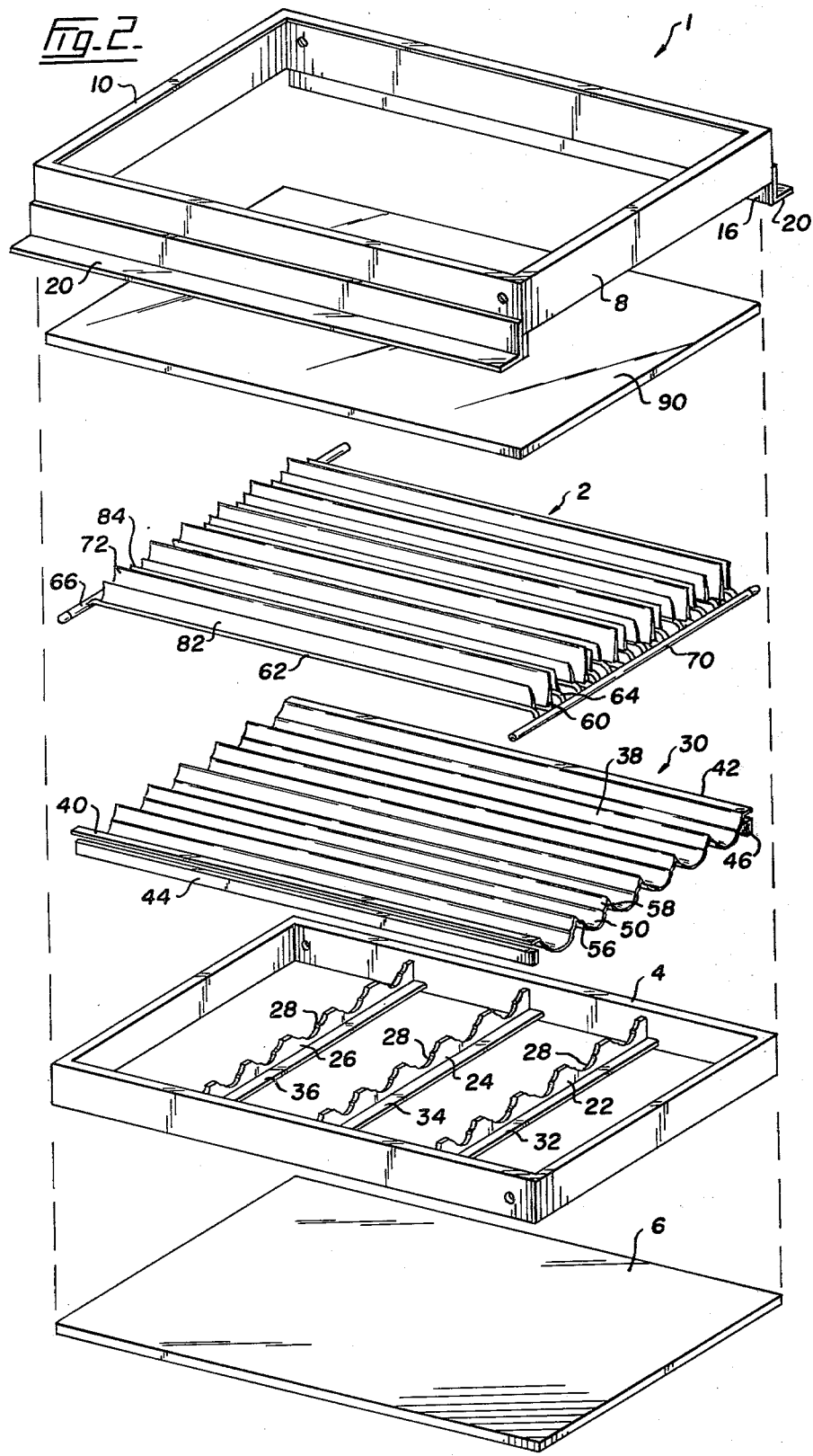

SOLAR COLLECTOR

BACKGROUND OF THE INVENTION

This invention relates to a solar collector.

In earlier patents, U.S. Pat. No. 4,003,638 to Winston shows trough-shaped collector structures. Similar solar collectors are disclosed in U.S. Pat. No. 4,099,515 to Schertz. U.S. Pat. No. 4,122,831 to Mahdjuri discloses a fin-like heat absorber. Other earlier patents include U.S. Pat. No. 4,069,812 to O'Neill and U.S. Pat. No. 4,059,094 to Mendoza.

SUMMARY OF THE INVENTION

According to the invention, a solar collector comprises a central, elongate conduit for fluid and a laterally concave, elongate reflective surface facing the central conduit. The central conduit extends centrally along the laterally concave surface. The surface has a shape to reflect solar radiation striking the surface onto the central conduit. A central, elongate reflective fin is connected to the central conduit and extends away from the laterally concave reflecting surface. The central fin has a shape to reflect solar radiation striking the central fin onto the central conduit.

A solar collector according to an embodiment of the invention efficiently utilizes solar radiation by employing a trough with a wide entrance aperture and reflectors adapted to concentrate the solar radiation onto fluid conduits to heat the fluid within the conduits to a desirably high temperature. One embodiment of the invention, when exposed to direct sunlight at an ambient temperature of 65° F., reached a temperature of 195° F. in less than 20 minutes. Even on cloudy days, this solar collector will operate, at times, at approximately 55% of its maximum working efficiency due to the large aperture of the trough.

In the drawings:

FIG. 1 is an isometric view of a solar panel, partly broken away, including a plurality of solar collectors according to an embodiment of the invention;

FIG. 2, appearing after FIG. 5, is an exploded isometric view of the solar panel of FIG. 1;

FIG. 3 is a sectional view taken along line 3—3 of FIG. 1;

FIG. 4 is an enlarged, fragmentary view of the central fluid conduit and the central fin of one of the solar collectors of FIG. 1;

FIG. 5 is a fragmentary view of one of the side conduits and one of the side fins of the solar panel of FIG. 1;

DESCRIPTION OF THE PREFERRED EMBODIMENTS

Figure 6:
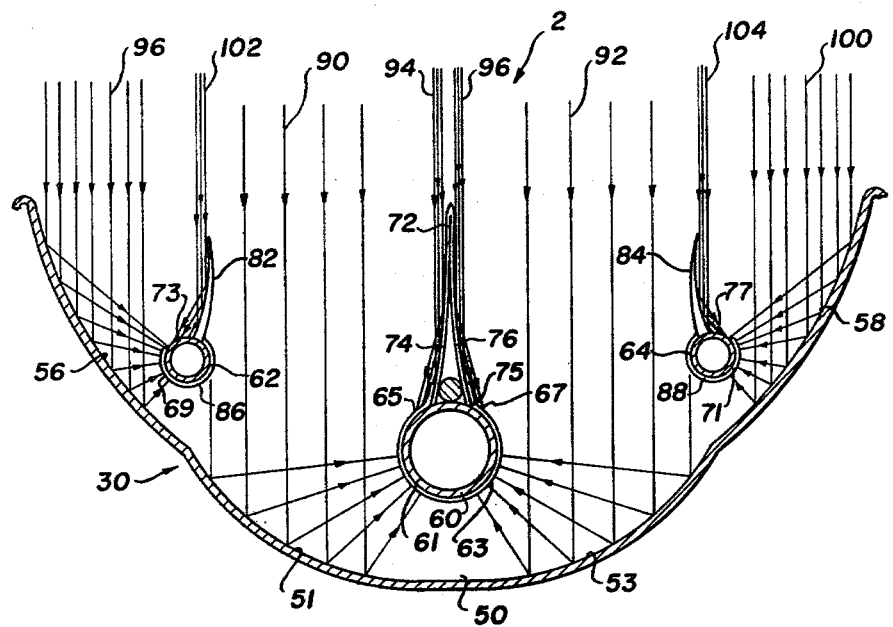
FIG. 6 is a sectional view of one of the solar collectors of FIG. 3, illustrating diagrammatically how the solar radiation is concentrated in the solar collector.

FIGS. 1 to 3 shows a solar panel 1 comprising a plurality of adjacent solar collectors 2. The solar panel 1 has a perimeter frame 4 of plywood and a rectangular plywood bottom 6.

As best seen in FIGS. 2 and 3, the plywood frame 4 is clad with an aluminum frame 8 on all four sides of the collector 1. Aluminum frame 8 has a top flange 10. The aluminum frame 8 is secured to the plywood frame 4 by means of a plurality of screws 12. The aluminum frame 8 has a skirt 14 which extends downwardly from the plywood bottom 6. Aluminum angle sections 16 abut the plywood bottom 6 and the skirt 14 along all four sides of the panel 1 and are secured to the bottom 6 by a plurality of screws 18. Brackets 20 may be secured to the skirt 14 and angle sections 16 for mounting the solar panel 1.

Three mirror supports 22, 24 and 26, of a suitable material such as plywood, extend across the solar panel 1. Each of the supports has an upper edge 28 contoured to receive mirror 30. Strips 32, 34 and 36 are secured along the bottoms of supports 22, 24, and 26, respectively, to reinforce these supports.

As seen in FIG. 2, mirror 30 has an upper reflective surface 38 and comprises a suitable material such as polished aluminum. Preferably, the aluminum is chrome electroplated on surface 38. Mirror 30 provides a continuous reflective surface for each of the solar collectors 2. Horizontal flanges 40 and 42 extend along the sides of mirror 38 and rest on top of rubber insulating blocks 44 and 46 respectively, as seen in FIG. 3. Blocks 44 and 46 are secured to plywood sides 4 by screws 12. Glass fibre insulation 48 fills the space between mirror 38 and plywood bottom 6 of the solar panel 1.

Mirror 38 forms a trough-shaped reflective surface for each of the solar collectors 2 comprising a laterally concave, elongate reflective surface 50 with two outer, longitudinal edges 52 and 54. Surface 50 comprises two parabolic reflective portions 51 and 53. Each solar collector 2 has two parabolic side reflective surfaces 56 and 58 extending away from outer edges 52 and 54 of laterally concave surface 50.

Each of the solar collectors 2 has a central conduit or copper tubing 60, extending centrally along the laterally concave surface 50 and spaced-apart therefrom. Conduit 60 is located near the focus of parabolic portions 51 and 53. Each solar collector 2 also has two side conduits, or copper pipes, 62 and 64 to each side of the central conduit 60. Side conduits 62 and 64 are spaced-apart from laterally concave surface 50 and extend longitudinally near the outer edges 52 and 54 respectively.

The conduits 60, 62, and 64 are interconnected at one end by the inlet header 66 and at the opposite end by outlet header 70. Preferably, each of the conduits 60, 62 and 64 has a black exterior surface for absorbing solar energy more readily.

A central, elongate reflective fin 72 is connected to each of the central conduits 60 and extends away from the laterally concave surface 50. Each of the central fins 72 has two opposite concave sides 74 and 76 which are generally parabolic in shape. Each of the fins 72 is of a suitable reflective material such as polished aluminum which is preferably chrome electroplated. Copper rods 78 are soldered to the tops of central conduits 60 and are located within the fins 72, at the bases 75 thereof, to help maintain the shape of the fins. A plurality of spring steel clips 80 secure fins 72 to the conduits 60 and copper rods 78. Alternatively, a heat conductive bonding agent may be used to secure the fins to the conduits and rods. A suitable adhesive is the epoxy-based substance commonly available for the repair of automobile mufflers.

Each of the solar collectors 2 has two side fins 82 and 84, again of a suitable reflective material such as polished aluminum, which is preferably chrome electroplated. Fins 82 and 84 have concave bottom portions 86 and 88, respectively, for clipping each of the fins onto side conduits 62 and 64, respectively.

A rectangular glass cover 90 is fitted over the solar panel 1 below the aluminum flanges 10. For a maximum transmission of solar energy, a low iron oxide glass should be used.

The solar panel 1 is preferably oriented so that the direct solar radiation in midsummer strikes each solar collector 2 perpendicularly, as seen in FIG. 6. The solar radiation 90 striking portion 51 of laterally concave reflective surface 50, to the left of central conduit 60 from the point of view of FIG. 6, is reflected by reflective surface 50 and strikes area 61 of central conduit 60 which faces portion 51 of reflective surface 50. Similarly, the solar radiation 92 striking the right portion 53 of reflective surface 50 is reflected by the reflective surface and strikes portion 63 of central conduit 60. In this way, laterally concave surface 50 serves to concentrate the solar radiation onto relatively small areas of central conduit 60, producing relatively high temperatures.

The solar radiation 94, which would otherwise strike the left side of central conduit 60, from the point of view of FIG. 6, strikes the parabolic reflective surface 74 of central fin 72 and is reflected by the fin onto the area 65 of central conduit 60 adjacent the base 75 of the central fin. The solar radiation 96, which strikes the reflective surface 76 of fin 72, is reflected onto the area 67 of central conduit 60 to the right of fin 72. Central fin 72 therefore serves to concentrate the solar radiation, which would otherwise be diffused over the entire top surface of central conduit 60, onto the relatively small areas 65 and 67 adjacent the base 75 of central fin 72.

The solar radiation 96 striking side reflective surface 56 is reflected onto portion 69 of side conduit 62 which faces the reflective surface 56. Similarly, the solar radiation 100 striking side reflective surface 58 is reflected onto area 71 of side conduit 64 which faces reflective surface 58. Consequently, side reflective surfaces 56 and 58 serve to concentrate the solar radiation striking these surfaces onto the relatively small areas 69 and 71 of the side conduits 62 and 64 respectively.

The solar radiation 102 which strikes fin 82 is reflected onto the area 73 of side conduit 62. Similarly, the solar radiation 104 striking fin 84 is reflected onto the area 77 of side conduit 64. In this way, fins 82 and 84 concentrate, onto the relatively small areas 73 and 74 of conduits 62 and 64, the solar radiation which would otherwise be diffused over the entire top surface of the conduits.

The solar radiation focused onto the central conduit 60 and the side conduits 62 and 64 of the solar panel 1 heats a suitable fluid within the conduit. This fluid can be a gas, such as freon, or a liquid, such as water. The fluid enters the conduit from inlet header 66 and flows through the conduit towards the outlet header 70. This solar collector can be used to provide hot water for industrial, domestic or commercial purposes. Alternatively, it can be used to provide steam to a turbine for generating electricity, to provide steam and heat for industrial applications or to provide energy for pumping water in agricultural areas.

Each solar collector 2 of solar panel 1 concentrates the solar radiation entering the relatively wide entrance aperture onto the four portions 61, 63, 65 and 67 of the central conduit 60, portions 69 and 73 of side conduit 62 and portions 71 and 77 of side conduit 64. This concentration of solar energy by reflective surfaces 56, 50 and 58 and by fins 72, 82 and 84 produces much higher temperatures than achieved by some prior art solar collectors. In fact, as mentioned above, the temperature is sufficiently great that the solar panel 1 can be used to produce steam.

Figure 7:
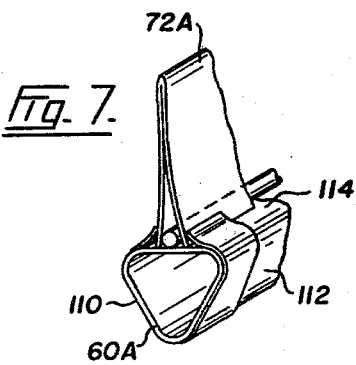
FIG. 7 is a fragmentary view of a central fin with an alternative central conduit which is generally triangular in section.

FIG. 7 illustrates an alternative central conduit 60A which is triangular in section. This shape is considered advantageous since the solar rays reflected from portions 51 and 53 of reflective surface 50, as shown in FIG. 6, strike the flat surfaces 110 and 112 almost perpendicularly. This increases absorption by decreasing reflection. Similarly, the rays reflected by central fin 72A strike flat top surface 114 more perpendicularly than with a round tube.

Figure 8:
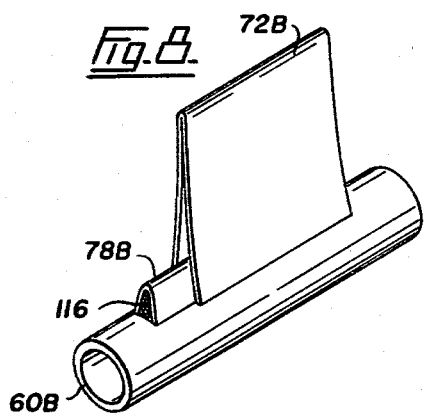
FIG. 8 is a fragmentary view of a central fin and central conduit with alternative means for connecting the fin to the conduit.

FIG. 8 illustrates an alternative means of connecting the central fin 72B to the central conduit 60B. In place of the copper rod 78 of FIGS. 1 to 7, a copper member 78B, which is shaped like an inverted "U" in section, is soldered to central conduit 60B. The centre of the section is filled with the heat conductive epoxy material 116 mentioned above, a suitable one being sold under the Trade Mark "Thermon". This same substance is used to bond fin 72B to member 78B.

What I claim is:

1. A solar collector comprising:
   a central, elongate conduit for fluid;
   a laterally concave, elongate reflective surface facing the central conduit, the central conduit extending centrally along the laterally concave surface, said surface having a shape to reflect solar radiation onto the channel conduit and two outer, longitudinal edges;
   a central, elongate reflective fin connected to the central conduit and extending away from the laterally concave reflective surface, the central fin having a shape to reflect solar radiation striking the central fin onto the central conduit;
   two side conduits for fluid, each said side conduit extending longitudinally near one said outer longitudinal edge of said laterally concave surface;
   two side reflective surfaces, each said side reflective surface extending away from one said outer edge of the laterally concave surface, facing one said side conduit, and having a concave shape to reflect solar radiation that strikes said each side surface onto one said side conduit; and
   two side fins, each said side fin being connected to one said side conduit and extending away from the laterally concave surface, each said side fin having a concave, reflective surface for reflecting solar radiation that strikes each side fin onto said one side conduit.

2. A solar collector as claimed in claim 1, the laterally concave surface having two portions extending to each side of the central conduit, each said portion focusing solar radiation onto an area of the central conduit facing said each portion.

3. A solar collector as claimed in claim 2, the central fin having a base connected to the central conduit and two reflective sides, each said side of the fin being concave for focusing solar radiation onto areas of the central conduit near the base of the central fin.

4. A solar collector as claimed in claim 3, the sides of the central fin being parabolic.

5. A solar collector as claimed in claim 2, each said portion of the laterally concave surface being parabolic in section.

6. A solar collector as claimed in claim 1, the reflective surface of each said side fin generally facing one said side surface.

7. A solar collector as claimed in claim 6, each said side reflective surface being parabolic for focusing solar radiation onto an area of one said side conduit facing said each side reflective surface; and
   each said side fin having a base connected to one said side conduit and being parabolic for focusing solar radiation onto an area of said one side conduit near the base of said each side fin.

8. A solar collector as claimed in claim 1, each said fin and each said reflective surface comprising polished aluminum.

9. A solar collector as claimed in claim 8, each said fin and each said reflective surface being chromium plated.

10. A plurality of solar collectors as claimed in claim 1, said solar collectors being adjacent each other and comprising a solar panel.

11. A solar panel as claimed in claim 10, having a transparent cover.

12. A solar panel as claimed in claim 11, the cover being glass.

13. A solar panel as claimed in claim 12 having a top, the glass cover being at the top of the panel, and a bottom, the panel comprising insulation between the reflective surfaces and the bottom.

14. A solar collector as claimed in claim 1, the conduits comprising tubing which is circular in section.

15. A solar collector as claimed in claim 1, the central conduit comprising tubing which is triangular in section, the central fin being connected along one side of the tubing.

16. A solar collector as claimed in claim 1, the central conduit being spaced apart from the laterally concave reflective surface.

* * * * *